May 7, 1935.  J. G. SHODRON  2,000,103

APPARATUS FOR STORAGE, CURING, AND PRESERVATION OF HAY

Original Filed Oct. 14, 1932

Inventor
JOHN G. SHODRON,
By
Toulmin & Toulmin
Attorneys

Patented May 7, 1935

2,000,103

UNITED STATES PATENT OFFICE 2,000,103

APPARATUS FOR STORAGE, CURING, AND PRESERVATION OF HAY

John G. Shodron, Fort Atkinson, Wis., assignor to James Manufacturing Company, Fort Atkinson, Wis., a corporation of Wisconsin Original application October 14, 1932, Serial No. 637,816. Divided and this application August 31, 1933, Serial No. 687,629

1 Claim. (Cl. 34—19)

This invention relates to improvements in hay containers, and has for its object to provide a hay container with means for causing a circulation of air through the container from the top thereof to various points along the center, from the top to the bottom.

It is particularly the object of this invention to provide a container having in the center thereof a vertical chute with a plurality of lateral openings, and means for delivering air into the container above the chute, with means for drawing the air from the chute and conveying it back into the container so that the air is discharged at the top of the container, passes through the hay into the vertical chute, and out to a point without the container for further circulation through the container.

These and other advantages will appear from the following description taken in connection with the drawing.

This is a division of copending application, Ser. No. 637,816, filed October 14, 1932.

Referring to the drawing.

Figure 1:
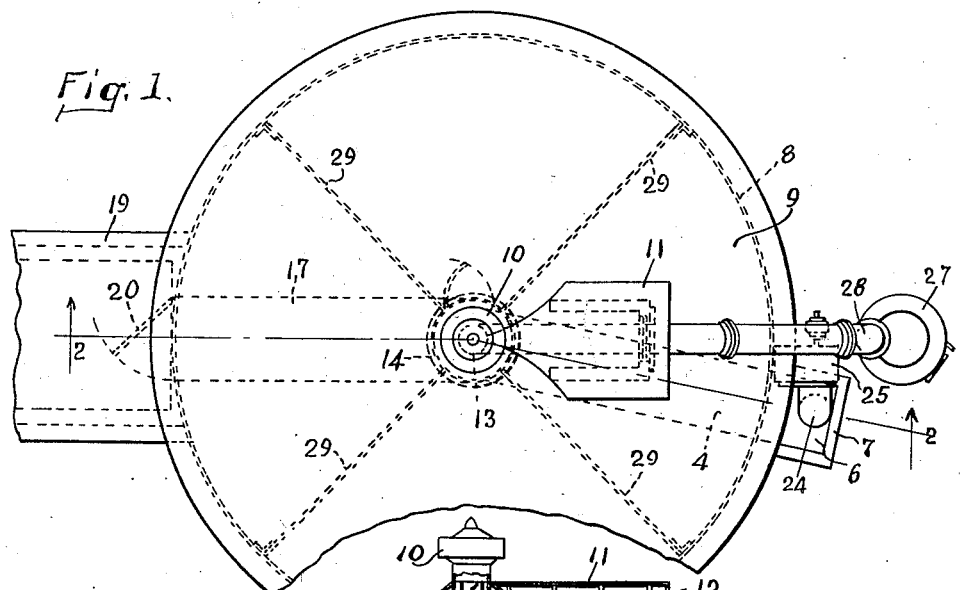
Figure 1 is a top plan view of the apparatus with one side broken away.
Figure 2:
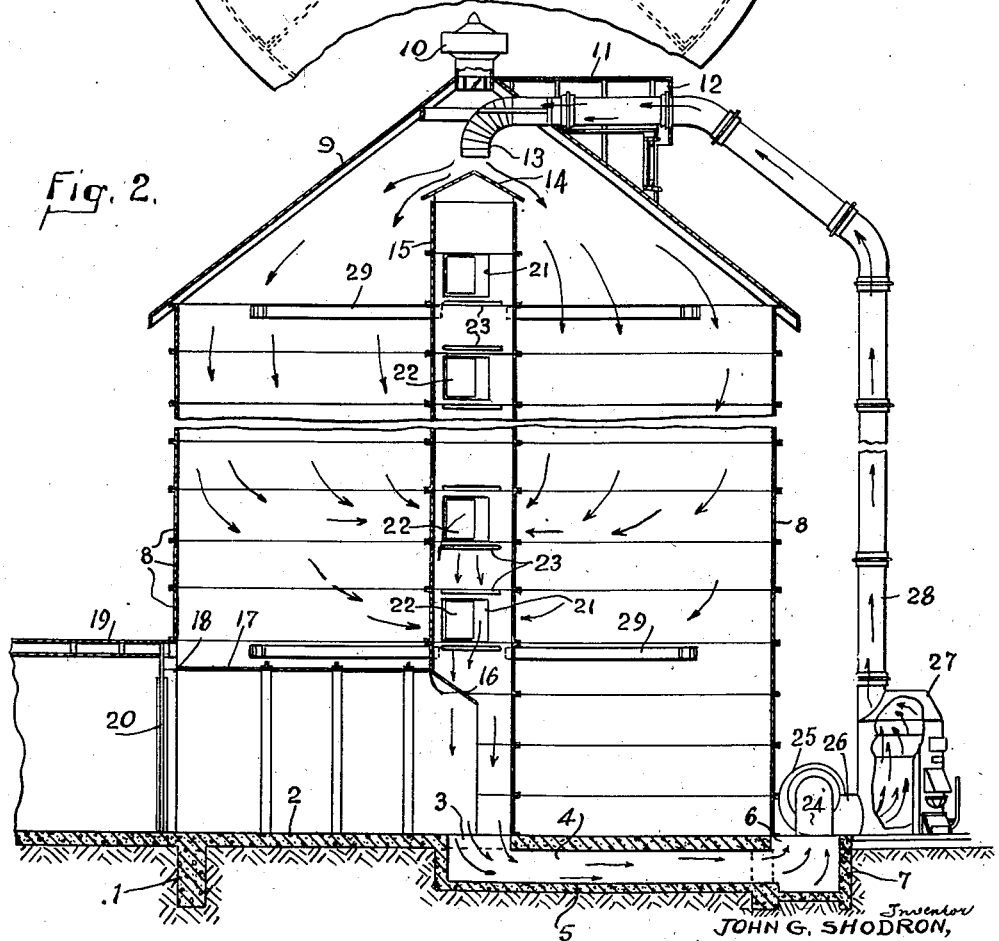
Figure 2 is a section on the line 2—2 of Figure 1.

The numeral 1 is used to designate a foundation wall which supports a floor 2, which has in the center thereof a hole 3 from which there extends an outlet air conduit 4 formed by means of a wall structure 5. This conduit has an outlet 6 formed by a wall 7.

Supported upon the foundation wall is a container composed of a plurality of sections 8, one placed upon the other so that a container variable in height may be provided. This container is covered by means of a roof 9, which has in the top thereof a ventilator 10 and to one side of the ventilator a projection 11, with an opening 12 therein adapted to receive and contain a spout 13 located immediately above a cap 14 on top of a chute 15, supported on the floor 2 with the bottom of the chute around the opening 3.

In one side of the chute adjacent the floor 2 is an opening or passageway 16. To this chute, at the passageway 16, is joined one end of a tunnel member 17, the other end of which joins the wall of the container at a passageway 18 through this wall. On the outside of the container and in alignment with the tunnel 17 is a stable structure 19. The tunnel is for the purpose of providing a passageway from the stable into the container and the chute so that hay and feed stuff may be transported from the chute, through the tunnel 17 into the stable.

The passageway at the entrance to the stable is provided with a door 20. The chute has therein a plurality of openings 21, each of which is closed by means of a closure 22. Attached to the chute adjacent the openings are ladder rungs 23. The outlet 6 has connected thereto an inlet 24 of a blower 25. This blower has an outlet 26, which leads into a heater 27 from which a chute 28 extends to the projection 11 and into the spout 13.

Within the container is a plurality of braces 29 for holding the chute 15 with relation to the wall of the container. The operation of the blower will cause a current of air to pass through the heater, up through the chute 28 and out at the spout 13, where it is divided and caused to go to all parts of the top of the container because of the cap 14. The air thus scattered passes into the top of the hay, through the hay and through the openings 21, into the chute, from which it is drawn at the bottom by the blower, as is clearly indicated by the arrows.

The amount of air used for ventilating and drying purposes may be determined by the speed of the rotation of the blower and by the extent of the openings 21, which is regulated by the closures 22. The force of the blower on the air within the container may be regulated by opening and closing the door 20. When this door is closed all of the air must come through the chute 15. When this door is partly open a part of the air drawn by the blower will be drawn in through the tunnel 17, thereby restricting the amount of air taken from the chute 15 and consequently the amount of air taken from the container.

It will be understood that I desire to comprehend within my invention such modifications as come within the scope of my claim and my invention.

Having thus fully described my invention, what I claim as new and desire to secure by Letters Patent, is:

A storage container for hay having peripheral walls and a roof, and a return air duct located substantially centrally of the container having a plurality of openings, and doors for closing said openings, a blower, an air passageway connected to the exit end of said blower and extending through said container adjacent the top thereof, and having an exit for air beneath the top of said roof, a conical cap on said return air duct for dividing the air as it leaves the exit of said passageway, whereby the air is caused to pass through the hay and enter said return air duct through at least one of said openings, said return air duct being connected to the suction end of said blower.

JOHN G. SHODRON.